H. KNAPP.
CLUTCH.
APPLICATION FILED JUNE 1, 1910.

986,923.

Patented Mar. 14, 1911.

2 SHEETS—SHEET 1.

Witnesses.

Inventor.
Heinrich Knapp.
By
Atty.

H. KNAPP.
CLUTCH.
APPLICATION FILED JUNE 1, 1910.

986,923.

Patented Mar. 14, 1911.

2 SHEETS—SHEET 2.

Witnesses.

Inventor.
Heinrich Knapp.
By
Atty.

UNITED STATES PATENT OFFICE.

HEINRICH KNAPP, OF WEIMAR, GERMANY.

CLUTCH.

986,923.  Specification of Letters Patent.  Patented Mar. 14, 1911.

Application filed June 1, 1910. Serial No. 564,366.

*To all whom it may concern:*

Be it known that I, HEINRICH KNAPP, residing at Weimar, Germany, have invented certain new and useful Improvements in Clutches, of which the following is a specification.

Band friction clutches with a brake band spirally surrounding the annular disk and in which the band is tightened by means of a longitudinally adjustable wedge are already known.

The band friction clutch according to this invention differs from known clutches of that kind in that one end of the friction band is secured to the outer clutch half, while the inner end of the said band is controlled by a wedge or by an adjustable bolt arranged in the same direction as the axis of the clutch, so that when the clutch is thrown into engagement by a longitudinal adjustment of the wedge, or by a movement of the bolt, preferably effected by means of a rotatable cam, the friction band secured to the outer clutch half, is stretched and pressed against the inner end of the friction band.

Several constructions are given by way of example in the accompanying drawings.

Figure 1:
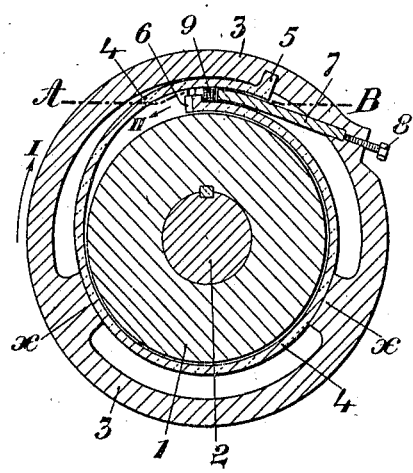
Figure 2:
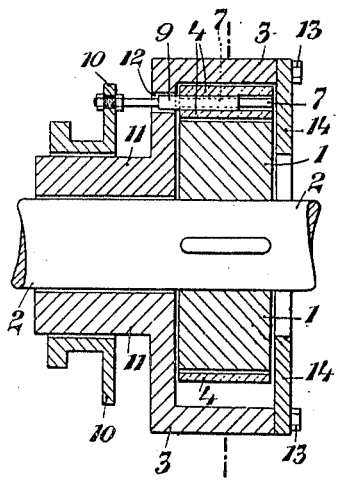
Figure 3:
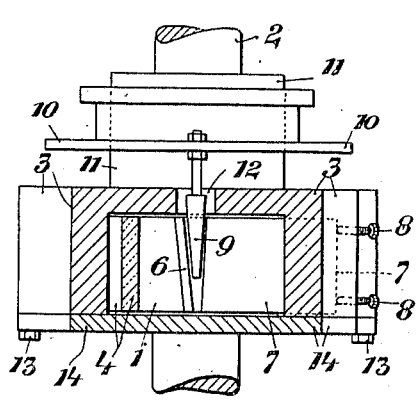
Figure 4:
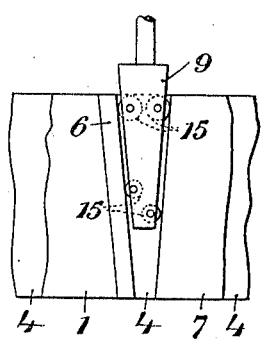
Figure 5:
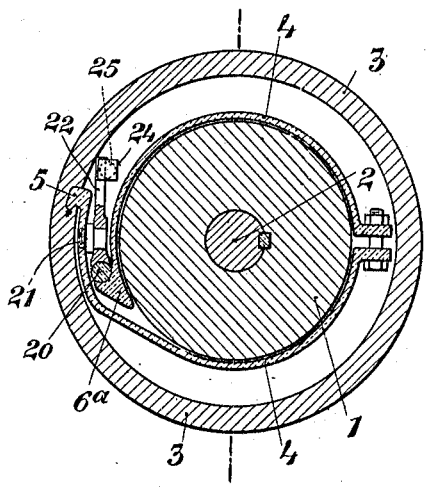
Figure 6:
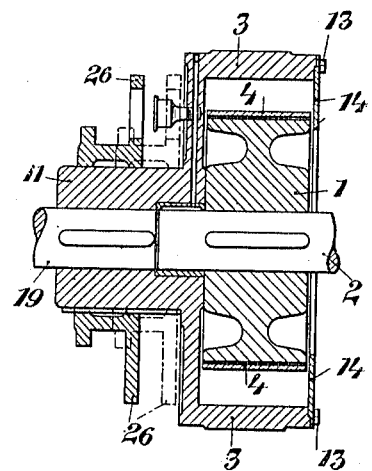
Figure 7:
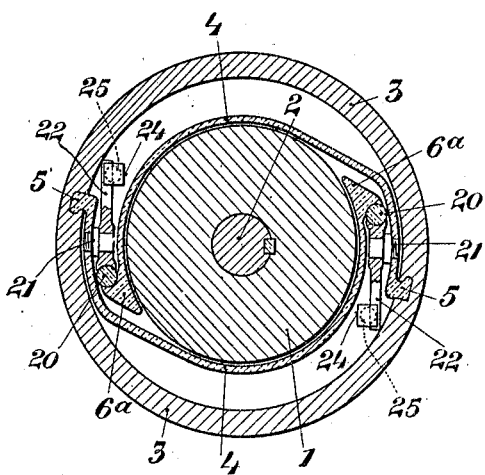
Figure 8:
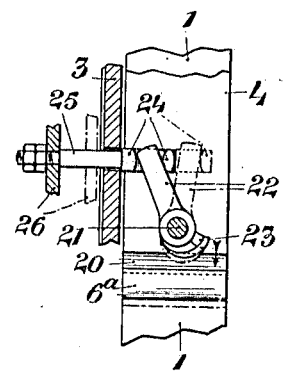

Figure shows a construction in cross section, Fig. 2 shows it in vertical longitudinal section, and Fig. 3 shows it in horizontal longitudinal section on the line A—B of Fig. 1, while Fig. 4 shows on an enlarged scale a detail of a device used for throwing in the clutch. Figs. 5 and 6 show in cross-section and in a vertical longitudinal section the second construction. Fig. 7 is a cross-section through a third construction, chiefly used for large clutches, and Fig. 8 shows in elevation the device for throwing into engagement the clutch shown in Figs. 5–7.

In the construction shown in Figs. 1–4, 1 is the inner clutch disk keyed to a spindle 2, and 3 is the outer clutch half rotating loosely on the spindle 2. The clutch disk 1 is situated in the cylindrical hollow space of the clutch half 3 and to the inner wall of the latter is secured at 5 in a suitable manner a spring band 4, for instance by inserting the projection 5 of the spring band 4 into a transverse groove of the outer clutch half 3 from the front. The spring band 4 loosely surrounds the clutch disk 1 in such manner that when the clutch is out of engagement, there is no contact of the clutch disk 1 with the spring band. In that position, the spring band rests against the inner wall of the outer clutch half, namely against projections $x$ of the same.

The end 6 of the spring band 4 freely suspended over the clutch disk 1 is formed into an outward projection. Both ends of the spring band overlap each other to a certain extent and between them is arranged an abutment 7 which is adjustable by means of screws 8 and is carried by the outer clutch half 3. The free end of the said abutment 7 is opposite the projection 6 of the spring band, a certain distance being left between them. For the purpose of throwing the clutch into engagement, a wedge 9 is driven between the projection 6 and the abutment 7, to which purpose the overlapping ends of the projection 6 and of the abutment 7 are oblique relatively to the wedge 9. The wedge 9 is mounted on the operating disk 10, and the latter is longitudinally adjustable on the hub 11 of the outer clutch half 3. The wedge 9 passes loosely through a recess 12 in the outer clutch half. At the free front side, the outer clutch half 3 can be closed by a covering disk 14 secured by means of screws 13.

The operation of the friction band clutch is as follows:—Assuming first that the outer clutch half 3 is the driving one, and the inner clutch disk 1 the driven one; if in that case the clutch is thrown in, which is effected by the driving in the wedge between the projection 6 and the abutment 7, the projection 6 will be first moved in the direction of the arrow II. In that way, the spring band is brought around the clutch disk 1 to be driven. Owing to its momentum the clutch disk 1 still offers a certain resistance to the outer clutch half 3 rotating in the direction of the arrow I, whereby the spring band is tightened still more, the wedge 9 being still further driven in, and the spring band presses down on the projection 6 or straightens slightly from its curved position in the vicinity of the part 6. Owing to this descent or straightening of the fastening end 5 of the spring band which is otherwise curved outward, the said spring band presses the wedge 9 which in its turn presses the free spring band end 6 firmly against the clutch half 1 so that the clutch disk 1 is absolutely locked to the clutch half 3. When the wedge 9 is loosened or withdrawn, the spring band 4 under its own resiliency returns at once to its position of rest shown in Fig. 1, that is to say, comes out of contact with the driven clutch disk 1. If the driving clutch half 3 is rotating in the direction opposite to that of the arrow I, the clutch disk 1 to be driven is still caused to participate in the rotation when the clutch is thrown into engagement. During the rotation, the spring band is tightened, and a thorough connection is produced between the two clutch halves, which remains until the wedge 9 is withdrawn. The clutch according to this invention is operative, however, even when the inner clutch disk 1 is the driving one and the outer clutch half 3 is the driven one, and in that case the direction of rotation is still immaterial. If the inner driving clutch disk 1 rotates in the direction of the arrow II and the clutch is thrown in, the spring band 4 will draw with it the outer clutch half. When the driving inner clutch disk 1 rotates in the opposite direction, the brake band 4 by means of its projection pushes the wedge to a certain extent, and the latter the abutment 7, and thus the outer clutch half 3, forward. But the fastening end of the spring band 4 acts in this case also so as to bring about a movement of the outer clutch half 3.

Fig. 4 shows a construction for making the wedge move easily when throwing the clutch in and out of engagement from a distance, the oblique surfaces of the wedge being provided for the purpose with rollers 15.

Instead of effecting the engagement of the clutch, and the stretching of the brake band, by means of a wedge, the device shown in Figs. 5-8 could also be used. In the construction in Figs. 5 and 6, unlike that in Figs. 3 and 4 two spindle ends 2 and 19 are used, the inner clutch half 1 being keyed to the spindle 2 and the outer clutch half 3 to the spindle end 19. On the free inner end 6ª of the brake ring 4, is arranged parallel to the clutch axis a bolt 20 on which acts a lever 22, pivoted at 21, by means of a cam or finger 23 (Fig. 8). The said lever 22 provided with the finger 23, engages in its turn with the fork 24 of a rod 25 secured to the throwing out ring or disk 26, so that when the throwing out disk 26 is moved toward the clutch, the fork 24 moves the lever 22 into the position shown dotted in Fig. 8, whereby the bolt 20 is moved by the finger 23 in the direction of the arrow in Fig. 8. When this stretching and locking device is used, the working is exactly the same as regards the engagement or operation of the brake band 4, as in the construction shown in Figs. 1-4.

In cases where it is a question of comparatively large dimensions, the brake band 4 is preferably divided in the manner shown in Fig. 5 whereby it becomes possible to make the clutch throughout in two or more parts. For still greater dimensions, it is advisable to arrange on one and the same clutch several such stretching and locking devices as that shown in Fig. 8 of the drawing, as shown in Fig. 7 where two stretching and locking devices are used.

What I claim as my invention and desire to secure by Letters Patent is:—

1. A friction clutch comprising two concentrically related elements arranged in spaced relation, the one being the driving element and the other being the driven element, a spring band having an end permanently secured to one of the elements and having its other end adjustable and overlapping the permanently secured end, the band being arranged in the space between the elements and having its adjustable end provided with a projection, a cam arranged between the overlapping ends of the band and engaging the projection, and a laterally movable part arranged on the outside of the clutch and connected with the cam to produce operative movements thereof.

2. A friction clutch consisting of two concentrically spaced elements, the one being a driving element and the other a driven element, brake band means interposed between the elements and including a fixed brake band end associated with one of the elements, an adjustable brake band end overlying the fixed brake band end and arranged adjacent the other element, the adjustable end having a projection, a cam engaging the projection and arranged between the fixed and adjustable brake band ends, and a laterally movable part arranged on the outside of the clutch and connected with the cam to produce operative movements thereof.

In testimony whereof I have hereunto set my hand in presence of two subscribing witnesses.

HEINRICH KNAPP.

Witnesses:
 ERNST EBERHARDT,
 CHAS. BORNGRAEBER.